United States Patent [19]

Cocchi

[11] Patent Number: 5,615,952

[45] Date of Patent: Apr. 1, 1997

[54] STIRRER FOR MACHINES FOR MAKING ICE CREAM OR THE LIKE

[75] Inventor: Gino Cocchi, Bologna, Italy

[73] Assignee: Ali S.p.A. - Carpigiani Group, Italy

[21] Appl. No.: 592,467

[22] Filed: Jan. 26, 1996

[30] Foreign Application Priority Data

Feb. 2, 1995 [IT] Italy ................................. GE95A0009

[51] Int. Cl.$^6$ ................................. A23G 9/22; B01F 7/04
[52] U.S. Cl. ............... 366/313; 366/325.93; 366/325.94; 366/331
[58] Field of Search ....................... 366/64–67, 309–313, 366/325.3, 325.7–325.94, 328.2, 328.3, 331; 62/342, 343; 165/94

[56] References Cited

U.S. PATENT DOCUMENTS

| | | | |
|---|---|---|---|
| 1,837,565 | 12/1931 | McDougall | 366/325.7 X |
| 4,183,680 | 1/1980 | Manfroni | 366/312 |

FOREIGN PATENT DOCUMENTS

| | | | |
|---|---|---|---|
| 497336 | 8/1992 | European Pat. Off. | 62/342 |
| 580115 | 1/1994 | European Pat. Off. | 62/342 |

Primary Examiner—Charles E. Cooley
Attorney, Agent, or Firm—Larson and Taylor

[57] ABSTRACT

A stirrer for machines for making ice cream includes a section of a rotary drive shaft, a first hub supporting a plurality of angularly equidistant radial spokes integral with the drive shaft section and a second hub supporting the same number of spokes as the first hub. The spokes of the second hub are provided at their ends with fastening components. The first hub contains radial passages that extend from a position diametrically opposite the spokes and through a longitudinal axis of the spokes to accommodate screw-type fastening members. The stirrer further includes a plurality of stirrer blades which have, at their axial ends, tapped holes for engaging the fastening members and fastening components to operatively connect the first and second hubs.

5 Claims, 2 Drawing Sheets

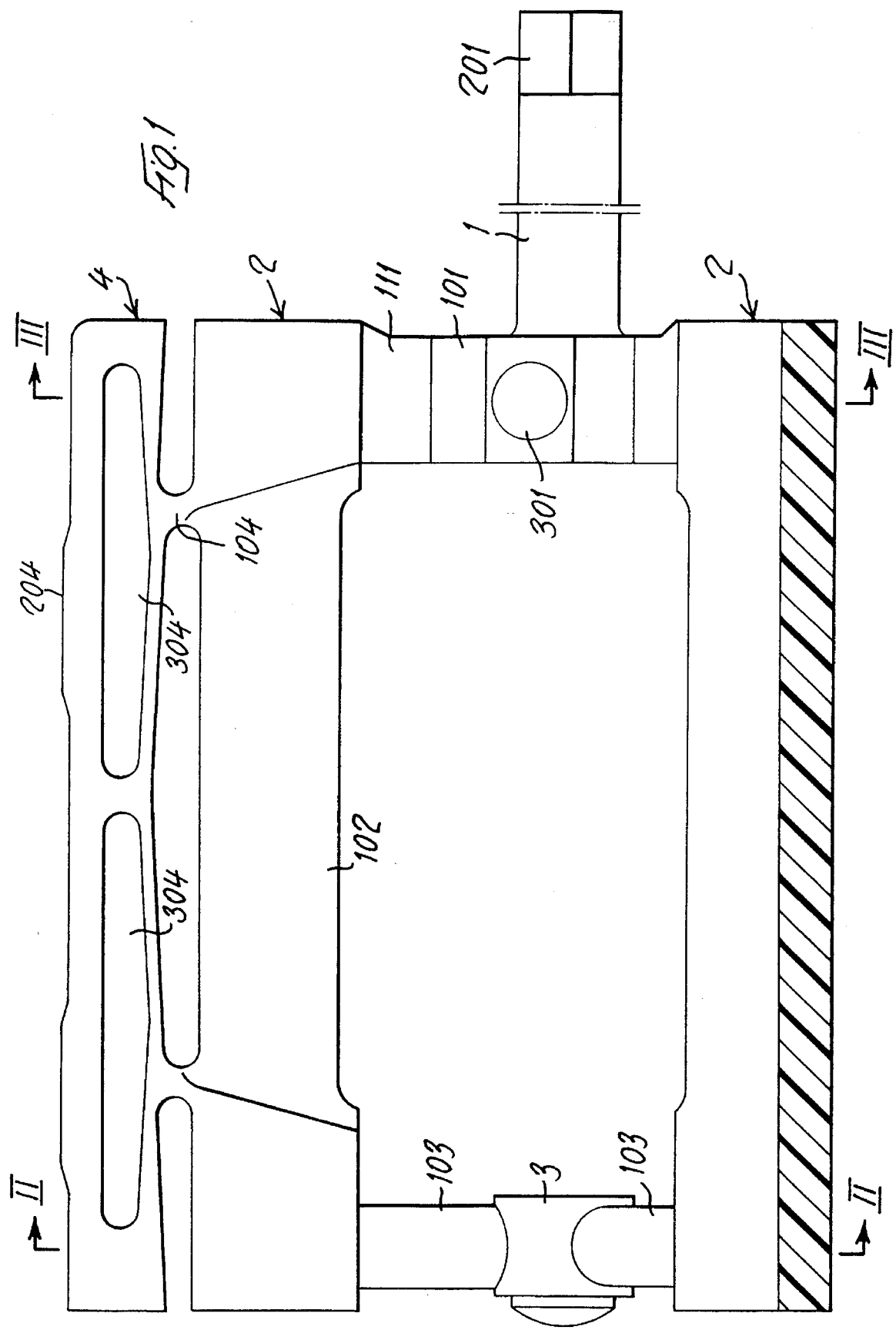

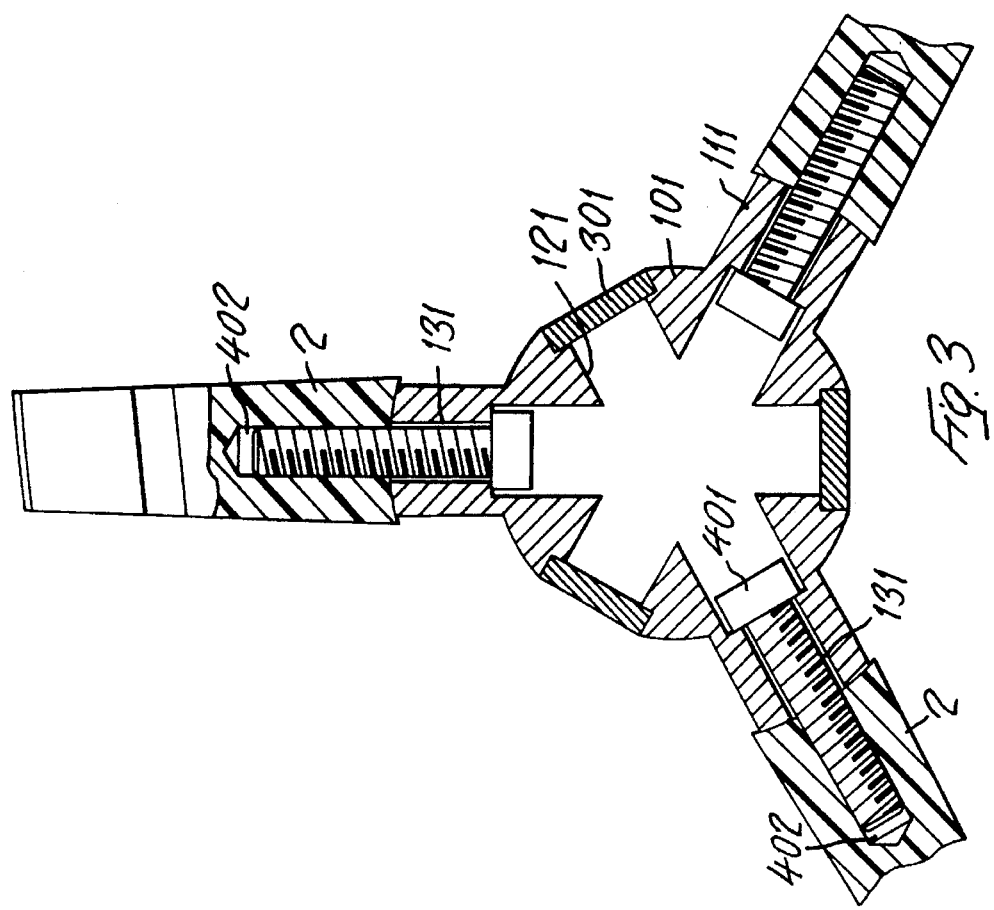
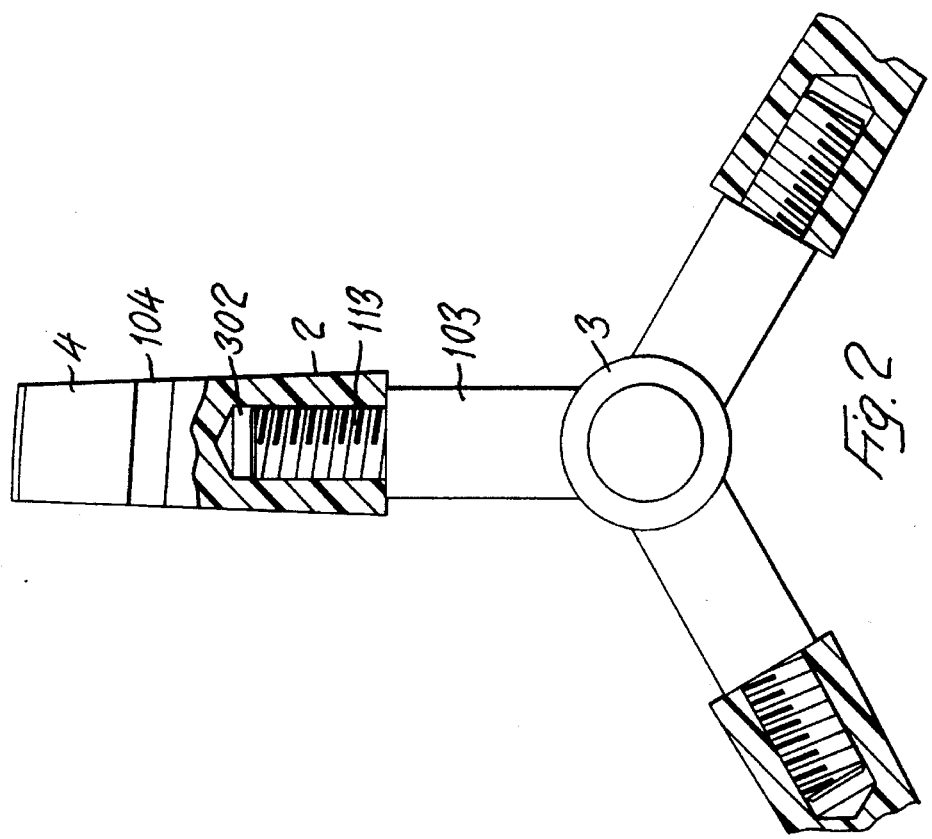

STIRRER FOR MACHINES FOR MAKING ICE CREAM OR THE LIKE

BACKGROUND AND SUMMARY OF THE INVENTION

The present invention relates to stirrers for machines for making ice cream or the like.

The prior art includes many types of stirrer for ice cream-making machines, which adopt a variety of different mechanical principles. Generally speaking, the stirrer assemblies of such machines comprise a plurality of stirring means, which may be flat blades or helical blades, some also being capable of scraping the inside surface of the chilling chamber of the ice cream machine, and these are connected to a rotary drive shaft which in turn is connected to drive means. The connection between these blades and the shaft may be achieved in a variety of ways, for example by means of a frame, usually of metal, connected to said shaft and designed to support the stirring and scraping means as reported in EP-A-0497336.

However, such a construction would certainly be somewhat heavy, given the large quantity of metal parts; and besides this, the great number of parts of which the frame is made makes the structure complex, difficult to fit, service and clean, and therefore liable to present a health risk.

In the Italian Patent Application GE 92A000077 a stirrer is disclosed in which the helically-shaped blades are made of plastic and constitute the largest part of the stirrer, and said stirrer comprises a drive shaft, a plurality of radial screws mounted equidistantly on said shaft by means of one end, and a screw-connecting hub to which the screws are fixed at the opposite end from the shaft. This stirrer also has scraper means mounted on said screws.

Such a device has great advantages over the prior art; however, the scraper means are inserted onto the stirrer blades and have thrust means to ensure that they contact the inside surface of the chilling chamber. They are therefore still decidedly complicated in construction. Moreover, in this stirrer the fastening means are housed in holes formed in said screws, which are then stopped up with plastic inserts; this makes for a real risk from the hygiene point of view, quite apart from the obvious complications of construction.

It is an object of the present invention to provide a stirrer that combines the utmost mechanical simplicity with the utmost hygiene. In addition, another object of the invention is a stirrer that has scraper means formed in the simplest possible manner on said stirrer blades.

The subject of the present invention is therefore a stirrer for machines for making ice cream or the like, comprising:

a section of a rotary drive shaft;

a first hub supporting a plurality of angularly equidistant radial spokes integral with the drive shaft section;

a second hub supporting the same number of spokes as the first hub;

which spokes of said second hub are provided at their ends with fastening components, and said first hub contains radial passages that extend, from a position diametrically opposite said spokes, axially through them, to accommodate pin-type fastening means;

and a plurality of stirrer blades provided at their axial ends with holes having means for engaging said fastening means of said first and second hubs.

Advantageously, said stirrer blades are made of plastic.

A further subject of the present invention is the fact that said stirrer comprises scraper means formed integrally with the stirrer blades themselves, so that said blades have no additional holes, inserts or moving parts.

Another subject of the present invention is the method of assembling stirrers of the type described above, comprising the following steps: the stirrer blades are fastened to the ends of the radial spokes of the second hub; and the opposite ends of said blades are fastened to the first hub, which is integral with the drive shaft section, by inserting the fastening means into the radial passages inside said hub, said passages being sealed with suitable inserts.

BRIEF DESCRIPTION OF THE DRAWINGS

Other advantages and features of the present invention will become clear in the following description of an embodiment thereof, given, purely by way of example and without implying any limitation, with reference to the accompanying drawings, in which:

FIG. 1 is a side elevation of the stirrer according to the present invention;

FIG. 2 is a sectional view on the plane marked II—II in FIG. 1; and

FIG. 3 is a sectional view on the plane marked III—III in FIG. 1.

DESCRIPTION OF THE PREFERRED EMBODIMENT OF THE INVENTION

In FIG. 1, 1 denotes the drive shaft section of the stirrer according to the present invention. This shaft section 1 has a square shaft end 201 which fits into a suitable recess to connect the shaft to the drive means provided in an ice cream-making machine (not shown). At the other end, the section 1 terminates in a hub 101 from which the spokes 111 radiate; each of said spokes 111 is connected, in a manner described below, to one end of each of the helical stirrer blades 2, which are preferably made of plastic. These blades 2 comprise a blade portion 102 towards the interior, and a scraper component 4 towards the exterior, of the stirrer. This scraper component 4 is formed integrally with the blade portion 102, and connected to it by the bridges 104. The scraper component 4 has two large through cavities 304, whose purpose will be described later: these are ellipsoidal and each pass through it occupying about half its length. On the outer edge of the scraper component 4 are scraper projections 204. At the far end of each blade 2 away from the end connected to the hub 101 integral with the shaft section 1, said blade 2 is connected to a spoke 103 mounted on a second hub 3, in a manner described later.

FIG. 2 is a sectional view of the stirrer of the invention. The blade 2 contains a tapped hole 302 into which the threaded end 113 of the spoke 103 radiating from the second hub 3 is inserted.

FIG. 3 is a similar view to the previous one and relates to the first hub 101 situated at the end of the drive shaft section 1. This hub 101 has three radial spokes 111; inside the hub, through holes 121 run diametrically through said hub 101 as far as the spokes 111 where they lead into the holes 131. The blade 2 contains, inside the spokes 111, tapped holes 402 into which the fastening means, in this case screws 401, are inserted after being introduced through the holes 121 and 131. The holes 121 are closed by the inserts 301.

The operation of the stirrer according to the invention and its method of assembly will be clear from the following. At the moment of assembling the stirrer, the manufacturer screws the blades 2 onto the spokes 103 of the second hub 3, inserting the threaded ends 113 of these spokes into the tapped holes 302 of the blades. At the end of this operation, the holes 402 at the opposite end of the blade 2 will be over the holes 131 formed in the spokes 111 radiating from the hub 101 of the shaft section 1. The manufacturer then inserts the fastening screws 401 into the holes 121 and, by screwing them home between the through holes 131 of the arms and the holes 402 of the blades, connects said parts together. After the parts have been fastened together, the holes 121 are closed off by means of the inserts 301.

The scraper components 4 are formed integrally with the blades 2. These scraper components 4 perform their function by rubbing against the inside surface of the chilling chamber of the ice cream machine with their scraper projections 204. These scraper components 4 are supported elastically, by virtue of the cavities 304 formed within them, on the blade portion 102 via the bridges 104. Advantageously, the scraper projections 204 are arranged on the edge of each scraper component 4 in such a way that they are staggered from one blade to the next, thus enabling the whole of the internal surface area of the chilling chamber to be scraped.

In the stirrer constructed in this manner, the fastening means that used to be used to connect the blades to the second hub are simply dispensed with and replaced by the threaded ends of the spokes of the hub itself. This, together with the fastening system adopted for the connection of the blades to the hub on the shaft section, makes assembly extremely simple and the stirrer safer from the point of view of hygiene. Furthermore, the integrally formed scraper means provide a further simplification of the construction and a further increase in hygiene.

I claim:

1. Stirrer for machines for making ice cream comprising:
   a section of a rotary drive shaft;
   a first hub supporting a plurality of angularly equidistant radial spokes integral with the drive shaft section;
   a second hub supporting the same number of spokes as the first hub, said spokes of said second hub including screw-type fastening components at ends thereof, said first hub including radial passages extending from a position diametrically opposite said spokes of said first hub and through a longitudinal axis of said spokes of said first hub to accommodate screw-type fastening means; and
   a plurality of stirrer blades including at their axial ends, tapped holes having means for engaging said screw-type fastening means and said screw-type fastening components, whereby said first and second hubs are operatively connected.

2. Stirrer according to claim 1 wherein said stirrer blades comprise plastic.

3. Stirrer according to claim 2, wherein said stirrer comprises scraper means formed integrally with the stirrer blades.

4. Stirrer according to claim 3, wherein said scraper means comprises scraper components formed integrally with said blades and connected to said blades by bridges, said scraper components having large axial through cavities and having scraper projections on outer edges thereof.

5. Stirrer according to claim 4, wherein said scraper projections are in a staggered arrangement on the outer edge of the scraper means of the different stirrer blades, so as to scrape a whole of an internal surface area of a chilling chamber of an ice cream machine.

* * * * *